(12) United States Patent
El Imam

(10) Patent No.: US 9,644,519 B2
(45) Date of Patent: May 9, 2017

(54) DEVICE AND METHOD TO USE THE SAME TO PURIFY POLLUTANT GASES

(71) Applicant: Umm Al-Qura University, Makkah (SA)

(72) Inventor: Salmah Mohammed El Imam, Makkah (SA)

(73) Assignee: Umm-Al-Qura University, Makkah (SA)

( * ) Notice: Subject to any disclaimer, the term of this patent is extended or adjusted under 35 U.S.C. 154(b) by 101 days.

(21) Appl. No.: 14/674,977

(22) Filed: Mar. 31, 2015

(65) Prior Publication Data
US 2016/0290206 A1    Oct. 6, 2016

(51) Int. Cl.
| F01N 3/00 | (2006.01) |
| F01N 3/02 | (2006.01) |
| F01N 3/10 | (2006.01) |
| F01N 3/20 | (2006.01) |
| F01N 5/02 | (2006.01) |
| B01D 53/92 | (2006.01) |
| F01N 3/04 | (2006.01) |
| F01N 13/08 | (2010.01) |

(52) U.S. Cl.
CPC .......... F01N 5/025 (2013.01); B01D 53/92 (2013.01); F01N 3/043 (2013.01); F01N 13/08 (2013.01); *B01D 2251/404* (2013.01); *B01D 2251/604* (2013.01); *B01D 2257/302* (2013.01); *B01D 2257/404* (2013.01); *B01D 2257/504* (2013.01); *B01D 2258/01* (2013.01); *F01N 2570/02* (2013.01); *F01N 2570/04* (2013.01); *F01N 2570/10* (2013.01); *F01N 2570/14* (2013.01)

(58) Field of Classification Search
CPC .......... F01N 5/025; F01N 3/023; Y02T 10/16; Y02T 10/20
USPC .................. 60/299–301, 320, 295
See application file for complete search history.

(56) References Cited

U.S. PATENT DOCUMENTS

| 2010/0236225 A1* | 9/2010 | Wahl ..................... F01N 3/2066 60/301 |
| 2014/0150413 A1* | 6/2014 | Backhaus-Ricoult .. F01N 5/025 60/299 |

\* cited by examiner

*Primary Examiner* — Nicholas J Weiss
*Assistant Examiner* — Dapinder Singh
(74) *Attorney, Agent, or Firm* — Geeta Kadambi; Riddhi IP LLC

(57) ABSTRACT

The present invention relates to a device and a method of using the same for purification and recycling of pollutant gases. The device is a tool to minimize and limit the impact of toxic gases emitted by cars' exhaust systems. The way this device works, makes it possible for the emitted gases, after the fuel combustion, through the exhaust system, to react with a strong alkaline fluid (calcium hydroxide). The result of this reaction is gases friendly to the environment, and natural precipitated components that can be very useful byproducts.

10 Claims, 5 Drawing Sheets

DEVICE AND METHOD TO USE THE SAME TO PURIFY POLLUTANT GASES

FIELD OF TECHNOLOGY

The present invention relates to a devise and a method of using the same to purify and recycle the environmental pollutant gases.

BACKGROUND

Environment pollution produced by combustion process is posing a great threat to living beings and to the vegetation surrounding them. A number of sources add to the environmental pollution including soil pollution, water pollution, air pollution, pollution because of harmful radiations, extended use of non-biodegradable materials and others. Among these, air pollution dominates as a single factor for increasing the environmental pollution. Air pollution comes through emission of harmful gases through combustion of fuel, gases coming out of the factoring, automobiles etc. Fuel used for combustion from residual gas comprise primarily of carbon monoxide, carbon dioxide, nitrogen oxide, sulfur oxide and non-combusted hydrocarbons.

Efforts are being done to lower the level of these gases from the environment and to find an alternative to eliminate emission of pollutant gases produced by combustion.

SUMMARY

The present invention discloses a device to purify and recycle harmful environmental gases. More specifically, the present invention discloses a device and a method of using the same to purify and recycle harmful environmental gases resulting from combustion of fuel by automobiles.

In one embodiment, the present invention discloses a purifying device to minimize and limit the impact of toxic gases emitted by automobile's exhaust system. In another embodiment, the present invention discloses a purifying and a recycler device wherein the device process and releases gas which is safe and friendly to the environment.

In one embodiment, the device as disclosed comprise of a cylindrical tube structure. In another embodiment, the device as disclosed further comprise of a tank located inside of the cylindrical tube structure.

In one embodiment, the tank as located on the top of the cylindrical tube structure contains a fluid. In another embodiment, the tank contain a mixture of fluids. The fluid as in the tank interact and react with the pollutant gases as they enter into the cylindrical tube structure through and opening. Further, the tank can be easily refilled through a cover located on the tank.

In one embodiment, the device as disclosed further comprise of a cover plate such as a left cover plate on left side of the cylindrical tube structure and a right cover plate on right side of the cylindrical tube structure. In another embodiment, the left cover plate is pierced thus forming a removable filter. The cover plate as disclosed can be easily put in and out of the cylindrical tube structure through one side of the structure. The cover plate is double walled and a pierced filter is sandwiched in between those walls.

In one embodiment, the device as disclosed further comprise of a mechanical switch on one side of the cylindrical tube structure. The switch is a open/close or a flip/flop type switch. In another embodiment, the mechanical switch may control the opening and closing of the tank located on top of the cylindrical tube structure. The mechanical switch is further controlled by the pressure of the pollutant gas.

In one embodiment, the tank as disclosed is located on either side of the cylindrical tube structure. In another embodiment, the tank as disclosed is located on the side of the cylindrical tube from where pollutant gases enter into the structure.

In one embodiment, the device further comprise of a thermoelectric generator. In another embodiment, the thermoelectric generator may be located inside of the cylindrical tube structure. The thermoelectric generator is located on another end of the cylindrical tube structure which is opposite of the location of the mechanical switch. The thermoelectric generator helps in transforming the heat generated from the exhaust into electric power which may be available at a socket wired to a battery.

In one embodiment, the present invention relates to a device, comprising: a cylindrical tube structure for the inlet and outlet of pollutant gas; a tank, wherein the tank is located on top of the cylindrical structure; a mechanical switch, wherein the switch controls opening and closing of the tank; a cover plate, wherein the cover plate comprise of a pierced filter for the polluted gas; and a thermoelectric power generator, wherein the power generator is located inside the cylindrical tube structure, wherein the device helps in purifying and recycling pollutant gas.

In one embodiment, a method of using the device is disclosed. The method as disclosed comprises: opening of a left cover plate of a cylindrical tube; passing of a pollutant gas through the cylindrical tube; releasing a fluid from a tank located on top of the cylindrical tube, wherein the fluid releases once the pollutant gas build pressure inside the cylindrical tube; mixing of the fluid with the gas, wherein fluid react with the gas to convert it into treated gas; and opening of a right cover plate of the cylindrical tube for the passage of treated gas, wherein the method helps in converting pollutant gas into treated gas which is safe for the environment.

In one embodiment, the fluid in the tank is a strong alkaline fluid whereas in another embodiment the fluid is calcium hydroxide.

The above mentioned summary presents a simplified version of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. Other aspects will be apparent from the following description, figures and the appended claims.

Other features of the present embodiments will be apparent from the accompanying figures and from the detailed description that follows.

DETAILED DESCRIPTION

The present disclosure relates to a device to purify and recycle harmful environmental gases resulting from combustion of fuel by automobiles. The device is a tool to minimize and limit the impact of toxic gases emitted by automobiles' exhaust systems. This impact affects humans, animals, and plants. Also, it has a great impact on the atmosphere and especially on the Ozone layer.

Device

Figure 1:
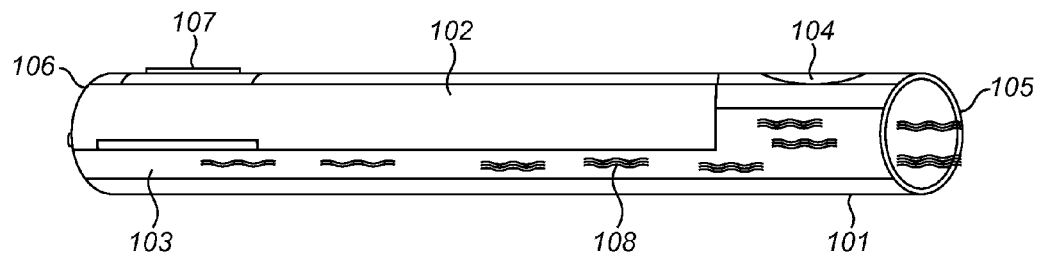
FIG. 1 shows structural details of the disclosed device.

FIG. 1 shows structural details of the disclosed device. The device as disclosed comprise of a cylindrical tube structure 101. The tube may be 1-4 cm thick, and 20-50 cm in length. Preferably, tube may be 2 cm thick and 30 cm in length. Pollutant gas 108 can pass through the tube during the process. The device further comprise of a left cover plate 106 and a right cover plate 105 which is used to cover the cylindrical tube structure. The device further comprise of a thermoelectric power generator 104. The generator helps in transforming the heat generated from exhaust into the electric power. This generator is located at the interior surface of the device at its connection with the exhaust where the thermal energy is transformed to an electric power which may then be stored in a battery. The electric power may be available at the socket wired to the battery. This power can be benefited from for several purposes, including charging cell phones, turning light bulbs that operate with batteries.

The tube 101 further comprise of a tank 102 which is located on top of the cylindrical tube structure 101. The tank is filled with a fluid which can be refilled through a cover 107. The fluid that is intended to be used is a strong alkaline solution such as calcium hydroxide. The pH value as desired is between 11.5-12.4. Calcium hydroxide has an ability to adsorb the poisonous gases. Calcium hydroxide can adsorb oxide along with lead and $CO_2$ gas from the pollutant gas sample. Calcium hydroxide also reacts with the sulfur to get calcium sulfite, the latter, when reacting with water, gives calcium carbonate as a precipitated compound which is used to get the limestone.

The tube further comprise of a mechanical switch 103. The switch 103 is an open/close or flip/flop switch. The switch controls opening and closing of the tank. The mechanical switch is further controlled by the pressure of the exhaust systems gases.

Figure 2:
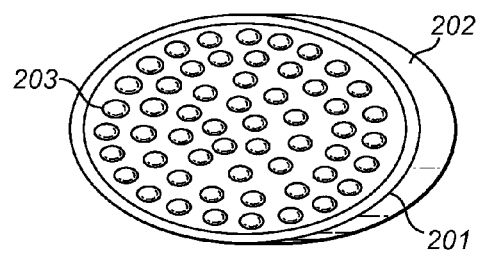
FIG. 2 shows structural details of pierced cover plate.

FIG. 2 shows structural details of the cover plate. The cover plate as shown comprise of a double wall structure (201; 202) which embed a pierced filter in between. The filter in the cover plate also helps in filtering out harmful gases. The cover plate may be 6-8 cm in diameter. preferably 7 cm. Perforated cover plates can also be made from dry calcium hydroxide nano-particles. These plates will be capable of resisting the heat, and will completely purify the oxides and other harmful gases emitted by the pollutant gas. They can be installed inside a cylindrical tube. The cylindrical tube at such a case may be 7 cm in width and 13 cm in length Functioning of the Device Before the combustion process, the initial state of the device is such that one side of the tube is open and other side is closed. Mechanical switch is at OFF position. There is no fluid coming out of the tank into the tube. However, when the pressure of the gas inside the tube reach a certain value purification of pollutant gas process starts.

Figure 3:
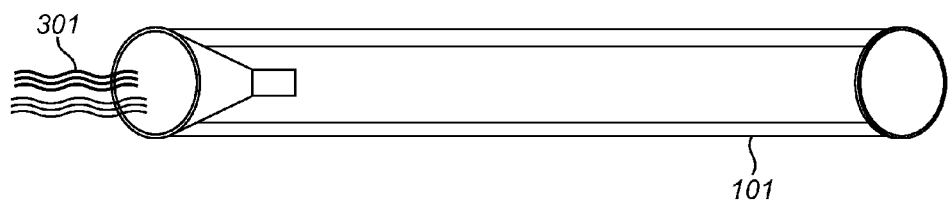
FIG. 3 shows functioning of the disclosed device.
Figure 4:
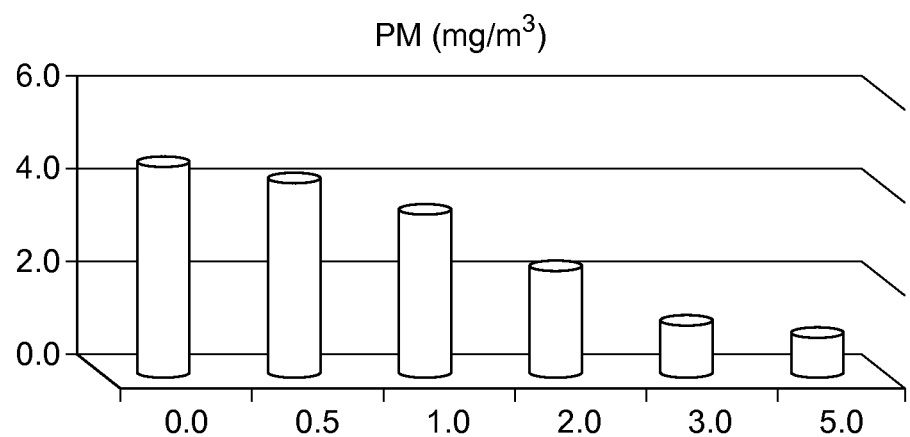
FIG. 4 shows suspended particles concentrations as measured in the treated gas.
Figure 5:
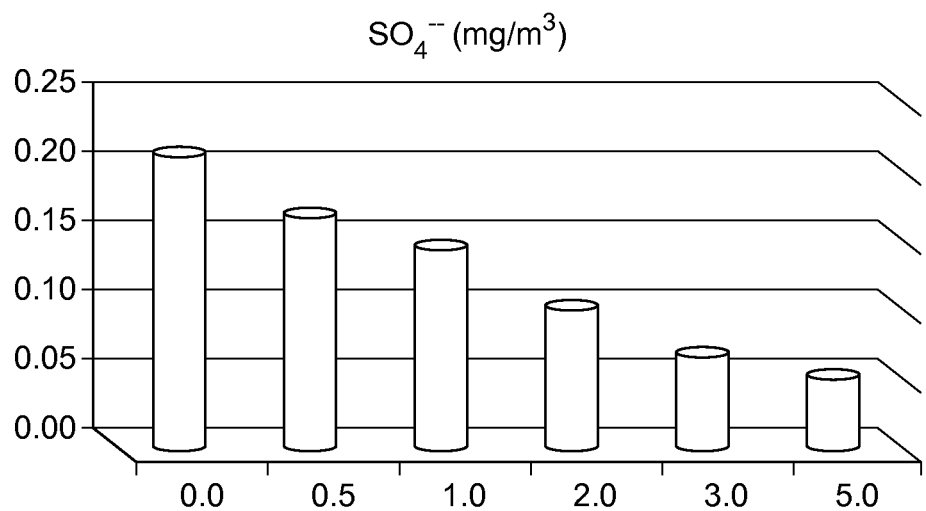
FIG. 5 shows sulphate concentrations as measured in the treated gas.
Figure 6:
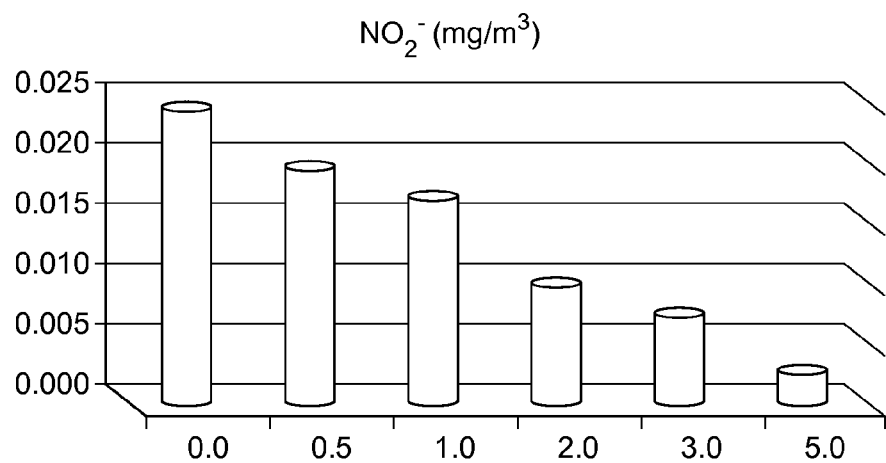
FIG. 6 shows nitrate concentrations as measured in treated gas.
Figure 7:
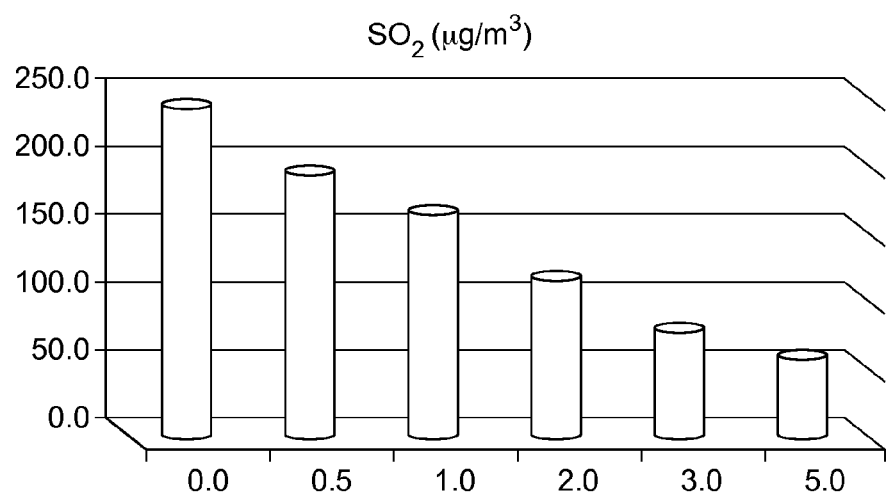
FIG. 7 shows sulfur dioxide concentrations as measured in the treated gas.
Figure 8:
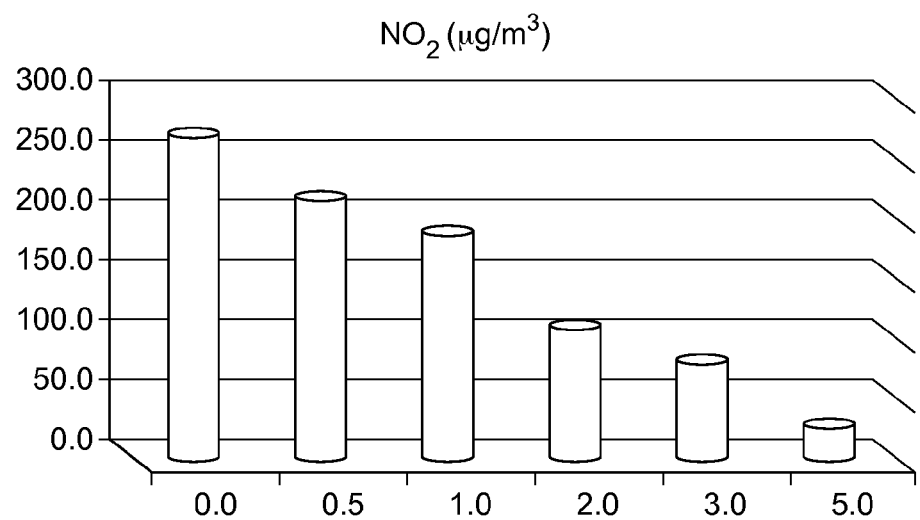
FIG. 8 shows nitrogen dioxide concentrations as measured in the treated gas.

As shown in FIG. 3, pollutant gases can enter into the cylindrical tube 101. As the pollutant gas enter into the tube, it start building the pressure. As the pressure builds up to a certain level, the mechanical switch will open the fluid tank 102 releasing the fluid into the tube. The fluid will then react with the pollutant gases present inside the tube and will help in cleaning and recycling the gases. The treated gas 301 is then released back into the environment.

Experimentation

Several studies have been conducted on the disclosed device, with liquid calcium hydroxide. The experiment was conducted on a Toyota Camry 1994 model.

Samples were collected first without the use of the disclosed device. Later, 5 samples were collected in different concentrations of calcium hydroxide material used in the device. The results are shown in table 1 and 2.

TABLE 1

Component analysis of the treated gas.

| $Ca(OH)_2$ (g/100 ml) | PM ($mg/m^3$) | $SO_4^-$ ($mg/m^3$) | $NO_2^-$ ($mg/m^3$) | $SO_2$ ($\mu g/m^3$) | $NO_2$ ($\mu g/m^3$) | % Eff. |
|---|---|---|---|---|---|---|
| 0.0 | 4.5 | 0.21 | 0.024 | 242.7 | 269.3 | 0.0 |
| 0.5 | 4.17 | 0.17 | 0.019 | 194.2 | 215.5 | 7.4 |
| 1.0 | 3.50 | 0.14 | 0.017 | 165.1 | 188.5 | 22.2 |
| 2.0 | 2.27 | 0.10 | 0.010 | 116.5 | 107.7 | 49.4 |
| 3.0 | 1.1 | 0.07 | 0.007 | 77.7 | 80.8 | 75.0 |
| 5.0 | 0.83 | 0.05 | 0.002 | 58.3 | 26.9 | 81.5 |

TABLE 2

Component analysis of the treated gas.

| Ca(OH)2 (g/100 ml) | CO (ppm) | $CO_2$ (ppm) |
|---|---|---|
| 0.0 | 4.1 | 3.8 |
| 0.5 | 3.4 | 3.4 |
| 1.0 | 2.7 | 2.8 |
| 2.0 | 1.9 | 1.7 |
| 3.0 | 1.6 | 1.4 |
| 5.0 | 1.4 | 1.1 |

Figure 10:
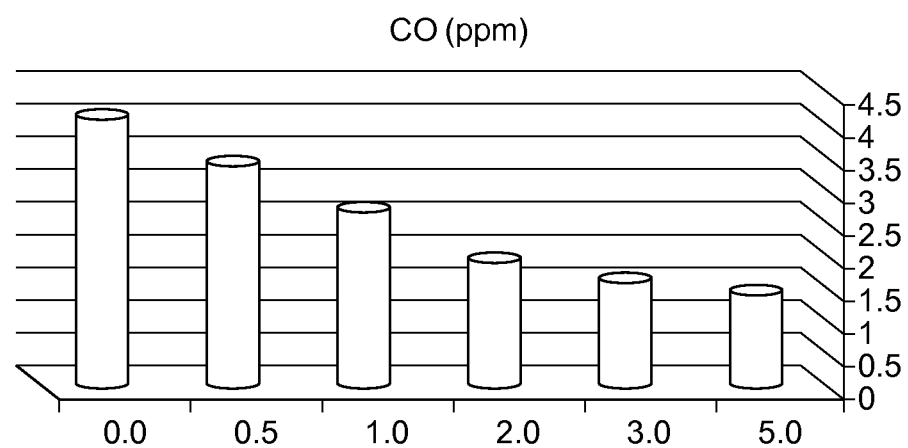
FIG. 10 shows carbon monoxide levels in treated gas.
Figure 11:
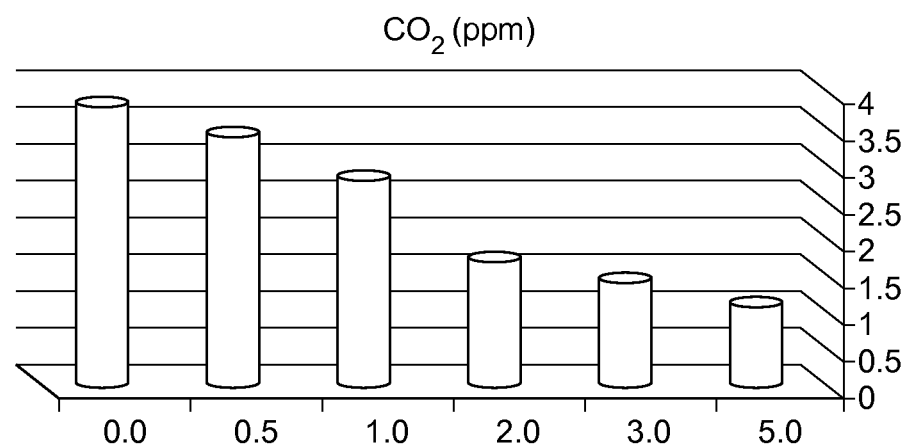
FIG. 11 shows carbon dioxide levels in treated gas.

As can be seen from FIGS. 4-8, concentrations of various pollution (such as suspended particle concentration FIG. 4; sulphate concentration, FIG. 5; nitrate concentration, FIG. 6; sulfur dioxide concentration, FIG. 7; nitrogen dioxide concentration, FIG. 8; carbon monoxide levels, FIG. 10; carbon dioxide levels, FIG. 11 respectively) caused by vehicle exhaust were reduced using the device, especially when concentrations of calcium oxide material solution are high.

Figure 9:
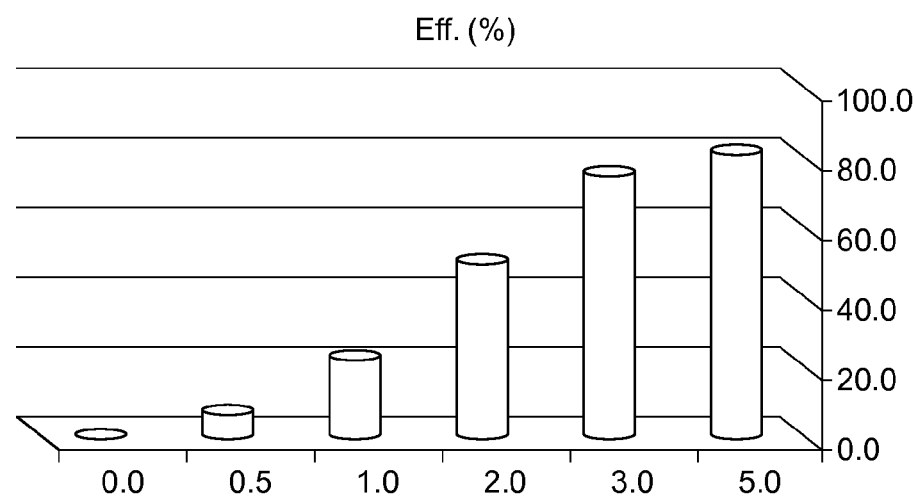
FIG. 9 shows disclosed device efficiency rate.

These pollution concentrations can be reduced down by 81.5% when using calcium hydroxide solution with concentration of (5 g in 100 ml distilled water) in old cars. In new cars, the efficiency shall be 100% (FIG. 9).

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. An exhaust purifying device, comprising:
   a cylindrical tube structure located at the end of an exhaust system to be an inlet and an outlet of a pollutant gas;
   a tank containing a fluid to treat the pollutant gas, wherein the tank is located on top of the cylindrical structure;
   a mechanical switch to open the tank when a pressure builds up inside the cylindrical tube structure with pollutant gas;
   a cover plate having a double wall structure and a filter to purify the pollutant gas and inserted in the cylindrical tube structure; and
   a thermoelectric power generator located inside the cylindrical tube structure, wherein the exhaust purifying device helps in purifying and recycling the pollutant gas by using a basic fluid to react and form a salt.

2. The device of claim 1, wherein the tank is filled with the fluid which is basic in nature.

3. The device of claim 1, wherein the mechanical switch controls an opening and a closing of the tank.

4. The device of claim 1, wherein the cover plate has a pierced filter.

5. The device of claim 1, wherein the thermoelectric power generator converts heat energy as produced from the pollutant gas into electric power.

6. The device of claim 2, wherein the fluid react with the pollutant gas, wherein the fluid is a calcium carbonate solution.

7. The device of claim 2, wherein the pollutant gas after being treated with the fluid is released to the atmosphere.

8. A method, comprising:
   opening of a left cover plate of a cylindrical tube;
   passing of a pollutant gas through the cylindrical tube;
   releasing a fluid from a tank located on top of the cylindrical tube, wherein the fluid releases once the pollutant gas build pressure inside the cylindrical tube;
   mixing of the fluid with the gas, wherein fluid react with the gas to convert it into treated gas;
   passing the treated gas through a thermoelectric generator located inside the cylindrical tube; and
   opening of a right cover plate of the cylindrical tube for the passage of treated gas, wherein the method helps in converting pollutant gas into treated gas which is safe for the environment;
   wherein, the left cover plate or the right cover plate includes a double wall structure and a filter to purify the pollutant gas.

9. The method of claim 8, wherein the fluid is an basic fluid.

10. The method of claim 8, wherein the method helps in recycling the pollutant gas.

* * * * *